United States Patent [19]

Rosenberg

[11] 4,424,899
[45] Jan. 10, 1984

[54] INSTRUMENT CARRYING CASE

[75] Inventor: Sheldon J. Rosenberg, New York, N.Y.

[73] Assignee: Western Electric Co., Inc., New York, N.Y.

[21] Appl. No.: 355,947

[22] Filed: Mar. 8, 1982

[51] Int. Cl.³ ............................................. B65D 79/00
[52] U.S. Cl. ................................. 206/305; 206/45.13; 206/45.2; 206/45.23; 190/109
[58] Field of Search .................... 206/305, 45.2, 45.24, 206/45.23, 45.13; 190/11, 16, 51, 42; 150/52 R

[56] References Cited

U.S. PATENT DOCUMENTS

| | | | |
|---|---|---|---|
| 529,760 | 11/1894 | Stevens | 206/45.23 |
| 1,863,047 | 6/1932 | Grimsley | 206/45.2 |
| 2,604,959 | 7/1952 | Arbib | 190/11 |
| 2,609,073 | 9/1952 | McLaughlin | 190/11 |
| 2,829,767 | 4/1958 | Scripture | 206/45.23 |
| 2,897,034 | 7/1959 | Kalen . | |
| 3,232,397 | 2/1966 | McCoy | 190/51 |
| 3,235,062 | 2/1966 | Myers | 206/305 |
| 3,240,324 | 3/1966 | Braun | 206/45.2 |
| 3,360,116 | 12/1967 | Somers et al. . | |
| 3,645,594 | 2/1972 | Cintz | 150/52 R |
| 3,913,711 | 10/1975 | Schmid | 190/16 |
| 4,143,695 | 3/1979 | Hoehn | 150/52 R |
| 4,259,568 | 3/1981 | Dynesen | 150/52 R |

FOREIGN PATENT DOCUMENTS

| | | | |
|---|---|---|---|
| 521359 | 3/1931 | Fed. Rep. of Germany | 206/45.2 |
| 1071576 | 12/1959 | Fed. Rep. of Germany | 206/45.2 |
| 1253921 | 1/1960 | France | 190/51 |

*Primary Examiner*—Joseph Man-Fu Moy
*Assistant Examiner*—David T. Fidei
*Attorney, Agent, or Firm*—R. F. Kip, Jr.

[57] ABSTRACT

The invention is for an instrument carrying case comprising an open-topped box, a lid having a substantially planar panel for covering the top of the box, and a flexible hinge joining the rear edge of the lid to the top edge of the rear wall of the box such that the lid is movable through an angle of about 270° from a position at which its panel covers the box to an "inside-out" position for the lid at which such panel is adjacent and substantially parallel to the outside of the rear wall of the box, and in which the normally forward part of the lid projects laterally beyond the bottom of the box. The case further comprises a fastening means for securing the box and the lid together when the latter is in such inside-out position.

1 Claim, 10 Drawing Figures

U.S. Patent Jan. 10, 1984 Sheet 3 of 3 4,424,899
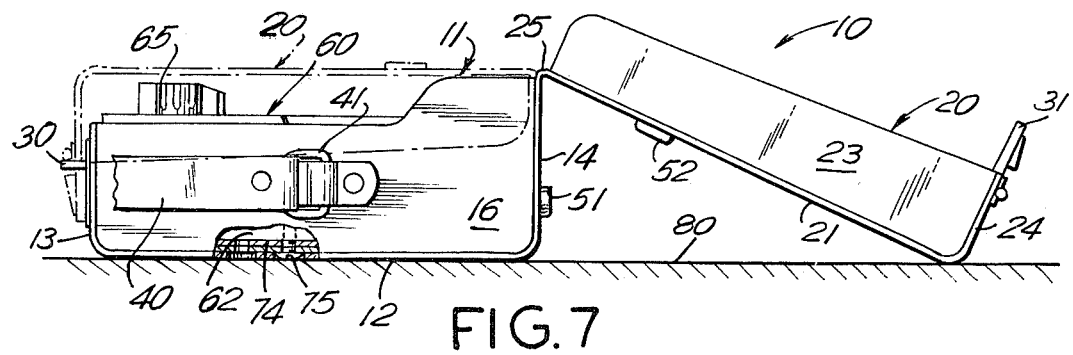
FIG. 7
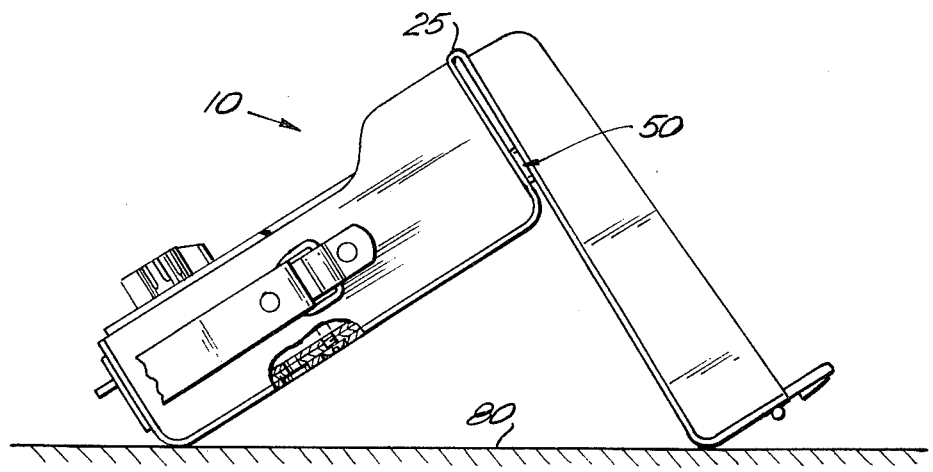
FIG. 8
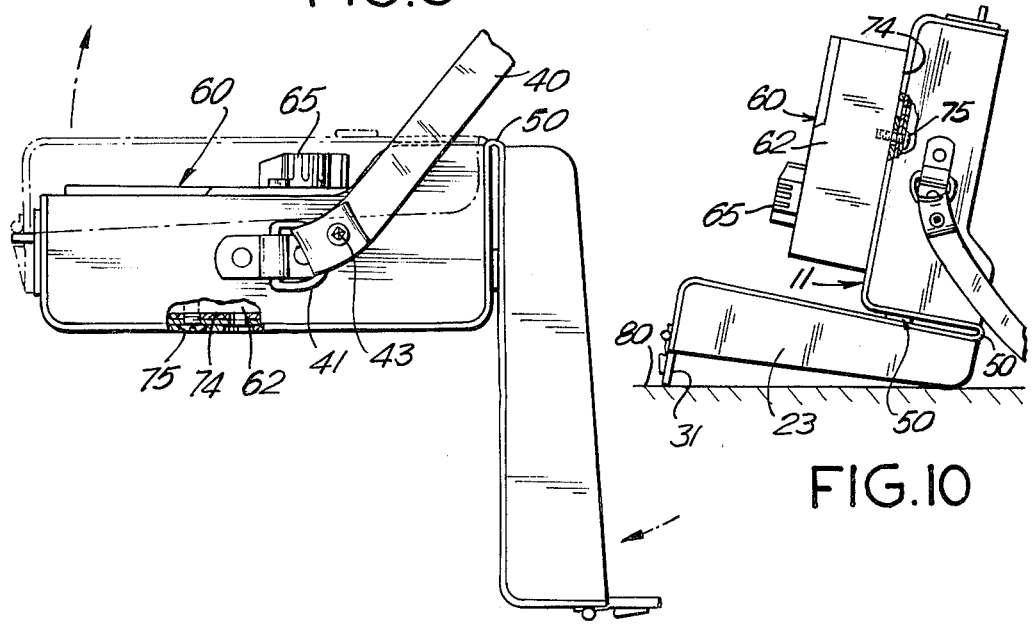
FIG. 9
FIG. 10

INSTRUMENT CARRYING CASE

TECHNICAL FIELD

This invention relates generally to carrying cases for electrical instruments. More particularly, this invention relates to carrying cases of such sort which are designed for convenient viewing of the instrument while disposed in or on the case.

BACKGROUND OF THE INVENTION

Various proposals have heretofore been made for devices adapted, when closed, to encase an object and, when opened, to promote the viewing of, and/or access to, that object.

For example, U.S. Pat. No. 3,360,116 issued Dec. 26, 1967 in the name of R. A. Somers et al. discloses a device for storing and displaying an electrical appliance such as an electric shaver. The device comprises an open-topped box-like container and a cover therefor, the cover having thereon trunnions received in bearings formed in the sidewalls of the container such that the cover can be moved from its position at which it closes the container to a position at which the cover is upstanding at the rear of the container, with the back part of the cover acting as a prop to raise the rear of the container off of a support surface therefor.

As another example, U.S. Pat. No. 2,897,034 issued July 28, 1959 in the name of G. H. Kalen discloses a carrying case in which an electrical meter is adapted to be mounted in a body for which there is a cover joined to the body by a coupling consisting of pivots projecting from the body and slidably adjustable within arcuate slots formed in the cover. That coupling is such that the cover is movable through an angle of somewhat more than 90° from a position at which it closes the front of the body to a position at which the rear end of the cover props up the rear end of the body when it is resting on a support surface.

As a further example, U.S. Pat. No. 3,232,397 issued Feb. 1, 1966 in the name of P. B. McCoy discloses a leather carrying case for an open-topped box-like insert adapted to be loaded with punch cards and then slid into the case. The McCoy case had two lid portions of which the forward one may be either closed to protect the punch cards or opened to permit access thereto.

The foregoing carrying case devices are unduly complicated and/or inappropriate for the carrying of an instrument and further, permitting adequate viewing of the instrument while it is in or on the device.

SUMMARY OF THE INVENTION

In contrast to the foregoing, an instrument carrying case according to the present invention in one of its aspects comprises (a) an open-topped box, (b) a lid having a substantially planar panel for covering the top of the box, and (c) a flexible hinge joining the rear edge of the lid to the top edge of the rear wall of the box such that the lid is movable through an angle of about 270° from a position at which its panel covers the box to an "inside-out" position for the lid at which such panel is adjacent and substantially parallel to the outside of the rear wall of the box, and in which the normally forward part of the lid projects laterally beyond the bottom of the box. The case further comprises (d) a fastening means for securing the box and the lid together when the latter is in such inside-out position. The lid when so secured is adapted to prop up the rear end of the box when the case is placed on a horizontal support surface to thereby provide convenient viewing of an instrument contained within the box.

As described in more detail, such carrying case may also provide for other modes of viewing of such instrument and, according to a feature of the invention, such carrying case may include means adapted to permit the instrument to be secured to the bottom of the box.

BRIEF DESCRIPTION OF THE DRAWINGS

For the better understanding of the invention, reference is made to the following description of a representative embodiment thereof and to the accompanying drawings wherein:

FIG. 7 is a right side elevation of the FIG. 1 case including the FIG. 4 instrument and showing one configuration of the case providing a mode of viewing the instrument;

FIG. 8 is a right side elevation of the FIG. 1 case including the FIG. 4 instrument and showing a second configuration of the case providing a second mode of viewing the instrument;

FIG. 9 is a right side elevation of the FIG. 1 case including the FIG. 4 instrument in which the case has the configuration of FIG. 8 but provides a different mode of viewing the instrument than in FIG. 8; and FIG. 10 is a right side elevation of the FIG. 1 case in which the FIG. 4 instrument is mounted on the outside of the bottom of the box to provide still another mode for viewing such instrument.

While the exemplary carrying case is, for convenience, described and claimed herein as having a certain spatial make this separate word orientations, it is to be understood that the invention of which such case is a representative embodiment is not restricted to any particular spatial orientation of any embodiment thereof.

STRUCTURE OF EMBODIMENT

Figure 1:
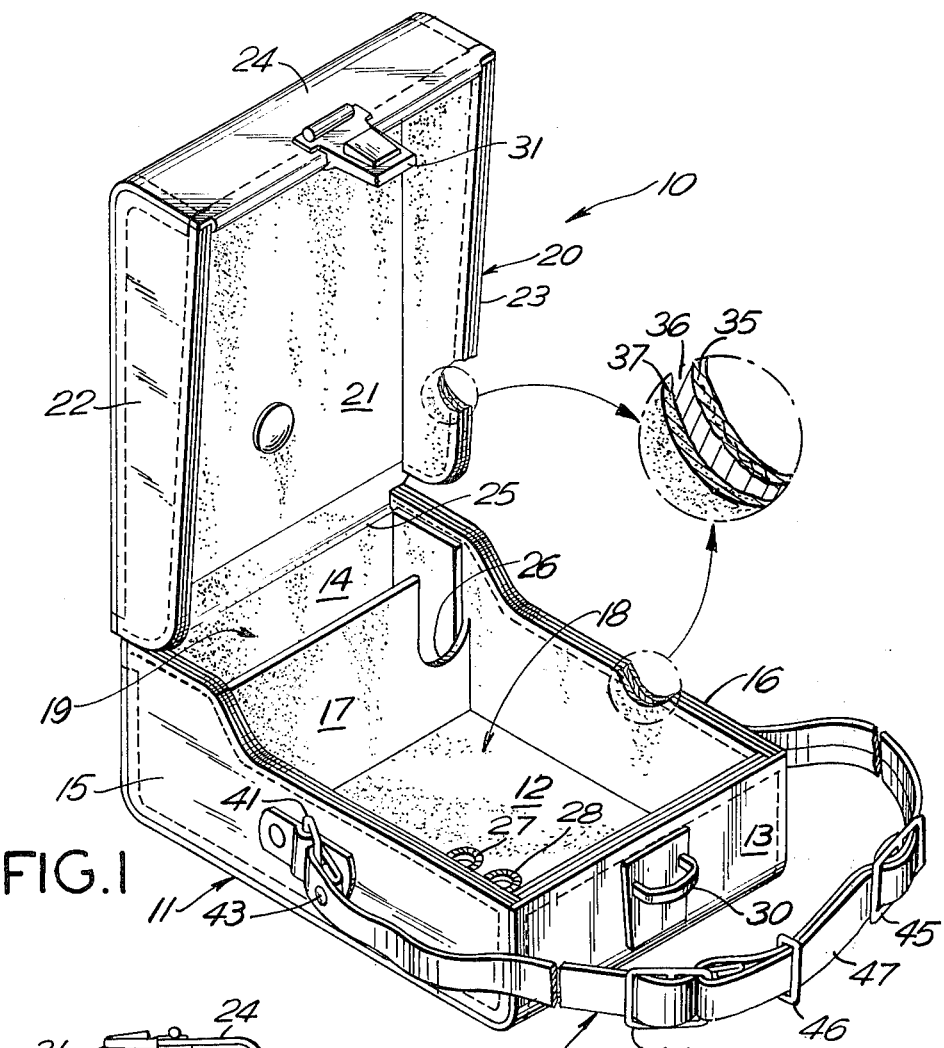
FIG. 1 is a perspective view of an instrument carrying case according to the invention, the lid of the case being raised to be at about 90° to the box thereof, and portions of one of the side flanges of the lid and one of the side walls of the box being broken away and removed to be illustrated in a separate showing which is magnified for clarification, and which portrays the laminate structure of that side flange and sidewall.

Referring to the figures, particularly to FIG. 1, the reference numeral 10 designates an exemplary carrying case according to the invention of which a part is an open-topped box 11 adapted for use as the container of or receptacle for an instrument as, for example, an electrical meter. The box 11 has a bottom 12 from which are upstanding a front wall 13, a rear wall 14 and left and right side walls 15 and 16. The mentioned side walls have the same height as the rear wall 14 from their connection therewith to a point about ¼ of the length of the side walls to the front wall 13. Beyond that point, the top edges of the side walls 15 and 16 are faired to decrease their height beyond the fairing (and all the way to the front wall) to about ⅜ of the height of the side wall at the rear wall. Such construction permits the case 10 to enclose an electrical meter which (including its knobs and controls) has a vertical dimension only slightly less than the height of the rear wall of box 10 while, concurrently, the lowered-height front portion of the side walls renders the side knobs and controls of the meter easily accessible and the face of the meter easily visible.

The interior of the box 11 is longitudinally divided by a transverse partition wall 17 into a larger front compartment 18 adapted to contain the meter and a smaller rear compartment 19 adapted to contain part of the leads for such meter. The partition wall 17 has formed therein on its right hand side a notch 26 permitting passage of such leads from the front compartment 18 to the rear compartment 19.

The bottom panel 12 of the box 11 has therein a pair of metal eyelets 27 and 28 anchored in the panel to extend vertically through it such that the two eyelets each provide a passage through the panel between the inside and the outside thereof. The purpose of such eyelets will be later explained.

Box 11 has coupled thereto a lid 20 comprising a top planar covering panel 21, side flanges 22 and 23 (downstanding from the left and right hand longitudinal edges of panel 21) and a front flange 24 downstanding from the front edge of that panel. The rear edge of panel 21 is joined to the top edge of the rear wall 14 of box 11 along the full transverse length of that edge by a flexible hinge 25 to be later described in more detail. The side flanges 22 and 23 and front flange 24 of lid 20 are outboard of, respectively, the side walls 15 and 16 and the front wall 13 of the box 11 to permit the lid to close down on the box with bottom portions of the mentioned flange elements of the lid overlapping with a slight horizontal clearance with portions of the tops of the mentioned walls of the box. Such overlap causes the inside of the box to be well protected from wetness and dust. A hasp 30 is mounted on the outside of front wall 13 of box 11 to cooperate with a spring loaded fastener 31 mounted on the front flange 24 of the lid so as to releasably hold the lid in a closed position on the box. After that lid has reached its normal closed position, further movement of the lid toward the box is stopped by a shelf like shoulder 32 (See FIGS. 2 and 6) formed on the inside of the front flange 24 of the lid to be vertically disposed intermediate the bottom edge of the flange and its juncture with the panel 21.

As illustrated in FIG. 1 by the magnified view of broken away portions of the side wall 16 and the side flange 23, each of the elements 12-16 inclusive of box 11 and of the elements 21-24 inclusive of lid 20 is constituted of a laminated structure rendering that element relatively rigid and consisting of an outer layer 35 of a flexible expanded vinyl material, a center layer 36 of stay board material and an inner layer 37 of flocking material. The outer flexible layer 35 renders each such element durable, gives it a pleasing appearance, and, to a degree, renders it impervious to exterior moisture and to being scratched or otherwise defaced. The center layer 36 is relatively stiff and imparts to each such element its rigidity. The inner layer 37 of flocking material is relatively soft so as to provide within the interior of case 10 a cushioning effect as well as giving such interior an attractive appearance. All three of the layers 35, 36 and 37 are bonded together by suitable bonding material, and the laminated structure of each element formed by such bonded layers is reinforced near the edges of each of the mentioned wall and lid elements by appropriate stitching as shown in FIG. 1.

The case 10 is equipped for carrying purposes with a leather strap 40 secured at its ends to metal rings 41 mounted on the outside of walls 15 and 16 of box 11, rings 41 passing through loops formed in the strap at its ends by connections of the strap back upon itself by rivets 43. The length of the strap can be adjusted by a conventional arrangement of buckles 44, 45, a slide 46 and a loop 47 formed in the middle of the strap.

The flexible hinge 25 permits the lid 20 to be swung from its position at which it closes box 11 through an angle of about 270° (See FIG. 8) to an "inside-out" position for the lid at which the outside of its panel 21 is adjacent to and substantially parallel with the outside of the rear wall 14 of the box 11. The lid 20 is adapted to be releasably secured in that inside-out position therefor by a fastening means which may be, for example, a snap button fastener 50 having male and female parts 51, 52 carried by respectively, the rear wall 14 and the panel 21 to each project slightly outward from the outer surfaces of those elements. Once the lid is fastened in that position by fastener 50, the lid will so remain securely until the connection between fastener parts 51 and 52 is broken by a pulling of the lid with moderate hand pressure away from the box 11.

Figure 4:
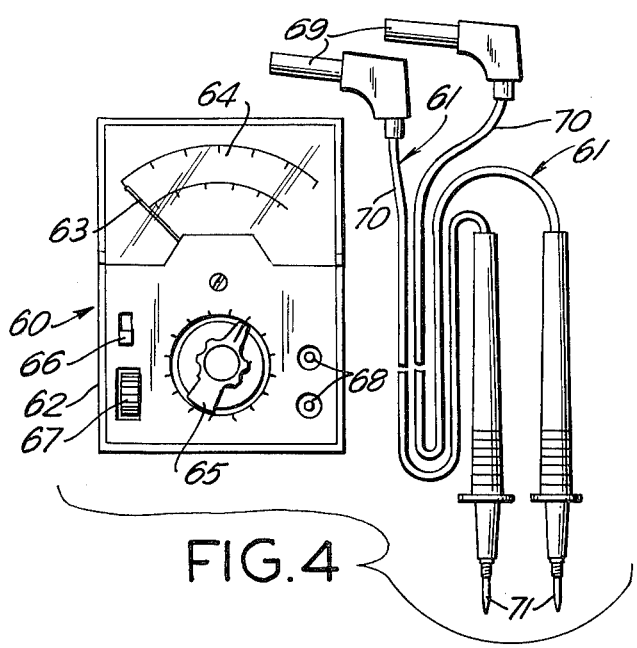
FIG. 4 is a plan view of an electrical instrument adapted to be carried by the FIG. 1 case, and of leads for such instrument.
Figure 6:
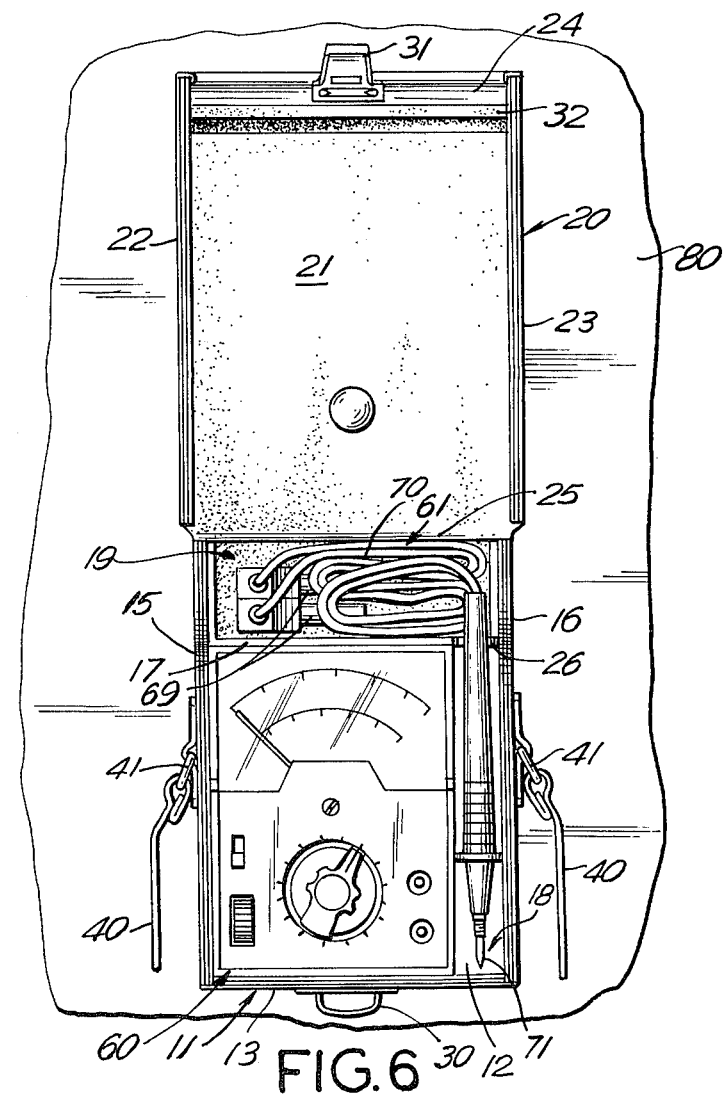
FIG. 6 is a plan view of the FIG. 1 case when the FIG. 4 instrument and leads are included in the box of the case, and when the lid thereof is opened to be at an angle of about 180° to the box.

FIG. 4 shows an electrical meter 60 and a pair of leads 61 therefor, all such elements being adapted to be carried within the box 11 of case 10. The meter 60 may be, for example, a combined volt-meter, ammeter and ohmmeter. The shown meter has a housing 62, an indicator needle 63, dial 64 with various scales thereon to read the deflection of the needle, a selector switch 65, other controls 66, 67 and jacks 68 for insertion thereinto of the plug ends 69 of the leads 61. In addition to those plug ends, the leads 61 include cords 70 and probes 71. As illustrated in FIG. 6, the meter 60 and its leads 61 may be conveniently stowed in case 10 in the manner shown in that last-named figure.

Figure 5:
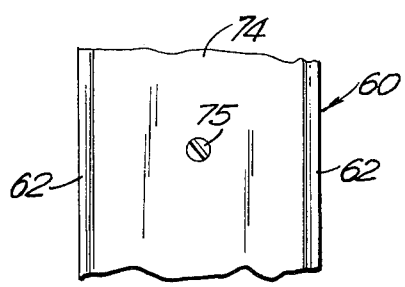
FIG. 5 is a fragmentary view of the bottom of the FIG. 4 instrument.

The housing 62 of meter 60 is closed at its back by a panel 74 (See FIG. 5) held in place by a plastic retaining screw 75 centrally located in the width of the meter but eccentrically located in relation to its length. Screw 75 may be partly retracted from panel 74 without becoming separated from the meter.

Some features of the carrying case 10 will now be considered in more detail.

Figure 2:
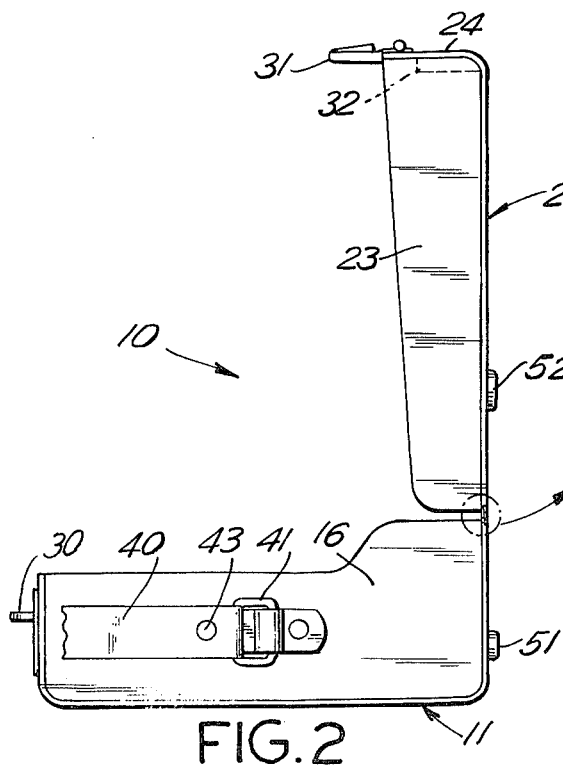
FIG. 2 is a right side elevation of the FIG. 1 case, a portion of the flexible hinge of such case being shown in an enlarged fragmentary view which is partly broken away.
Figure 3:
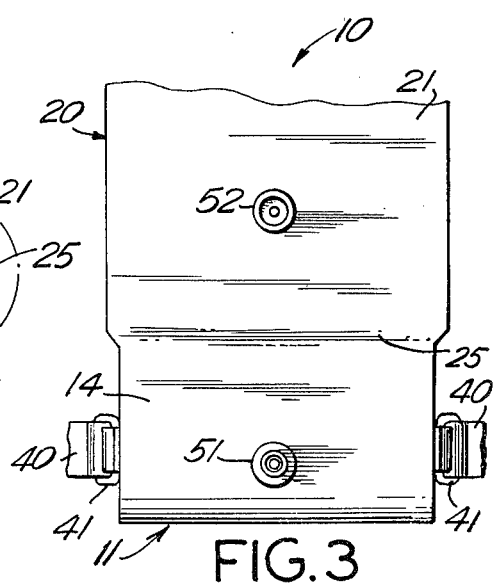
FIG. 3 is a rear elevation of the FIG. 1 case with part of its lid being broken away.

As best shown by the enlarged fragmentary view of FIG. 2, the hinge 25 consists of the outer layer 35 of flexible expanded vinyl material and the inner layer 37 of flocking material bonded in the hinge region directly to the layer 35, the middle layer of stiff stayboard having been omitted from that region. Of the two layers 35 and 37 in the hinge region, the layer 37 is structurally weak and plays no significant structural role insofar as the hinge is concerned. Thus, it is the layer 35 which, in essence, structurally provides the hinge 25 and imparts to it its properties of flexibility and durability.

Considering the structure of the hinge 25 as being constituted solely of the material of layer 35, the section of layer 35 which includes the hinge structure is in the form of a continuous sheet which, on the lid 20, covers the outside of front flange 24 and panel 21, extends from there across the hinge region to the top edge of rear wall 14 of box 11, and then covers the outside of that rear wall and of the bottom panel 12 and of the front wall 13 of the box. That is, the hinge structure is provided by a narrow strip of such sheet extending transversely across the sheet and longitudinally located centrally thereof such that the strip is disposed between separate sheet portions which respectively cover, as described, outside portions of the lid 20 and portions of the box 11. The hinge 25 by virtue of being constructed of such strip of layer 35 is a simple and inexpensively provided element which has the advantages of being inseparably secured to box 11 and lid 20, of being very rugged and durable, and of being flexible and pivotable enough, in effect, to permit the lid to be swung through an angle of at least about 270° in relation to box 11.

When the lid 20 is swung through that angle and then secured to the rear of box 11 by the fastener 50 (See FIG. 8), it is desirable that, insofar as possible, the lid act as a stiff beam or column in order without bending to prop up the rear of the box or to otherwise determine its spatial orientation. The top panel 21 of the lid is already, of course, quite stiff by virtue of the inclusion therein of a stayboard layer 36. Such stiffness of the panel 21 against bending is reinforced by its connection with its side flanges 22 and 23 which themselves are rendered stiff by inclusion therein of a stay board layer 36, and which, together with the panel 21, impart to the lid 20 a half "H" cross-sectional configuration which is well known for its resistance to bending. Accordingly, the lid 20 is well adapted to act as a stiff column or beam.

As shown in FIG. 8, the fastener 50 which secures the lid 20 to box 11 is located nearer to the bottom than to the top of the rear wall 14 of the box. That location for the fastener has the advantage that if, when case 10 is in its FIG. 8 configuration, there is an inadvertent downward blow or other force on the case producing on the lid 20 a counter clockwise moment exerted around hinge 25 as a pivot and tending to break the connection between the parts 51 and 52 of the fastener, such "opening-up" moment will be resisted by an opposing moment which is generated around the same pivot point 25 by the holding force between points 51 and 52, and which will be proportional to the displacement of those parts from the hinge pivot points 25 and, thus, greater when the fastener 50 is located as shown than if the fastener were to be located, say, between the hinge 25 and the vertical center point of the rear wall 14 of the box. It follows that fastener 50 is well adapted by virtu of being placed nearer to the bottom than to the top of the box to prevent inadvertent and undesired releasing of the lid from the box once the former has been secured in its inside-out position to the latter.

It will be noted that the length of the side walls 15 and 16 of the box 11 is about 3 times greater than the height of its rear wall 14, and the transverse width of the walls 13 and 14 of the box is about twice greater than such height. It follows that the dimensions of lid 20 are similar, ie., the length of such lid is about 3 times such height and the width of the lid is about twice that height.

Such dimensions of the box and of the lid in relation to the height of the rear wall of the box are advantageous not only because they are well adapted to accommodate meter 60 and its leads 61 in the box, but, also, for other reasons as follows. If the lid were to be substantially less than about 3 times the height of the rear wall 14, then the lid would not project downward beyond the bottom of the box for a distance adequate to prop up the rear of the box sufficiently to provide optimum viewing of the meter when the case is used in its FIG. 7 configuration for viewing the meter. On the other hand, if the lid were to be much greater in length than about 3 times the height of wall 14, while the viewing of the meter when the case is in its FIG. 8 configuration would be adequate, the configuration of the case 10 would be transversely narrow in relation to the distance between the regions of contact of the case with a support surface. Hence, the configuration would be unstable inthe sense that the case could be easily knocked over by an inadvertent sidewise blow.

Assuming for the reason stated that a length of the lid about 3 times the height of rear wall 14 is more or less optimum, if then the width of the lid is about twice such height, such width provides an adequately broad base for the lid when used as a prop for the box and, thus, the case may not easily be inadvertently knocked over sidewise. With an approximate 3:1 ratio between the length of the lid and the height of rear wall 14, and an approximate 2:1 ratio between the width of the lead and such height, it follows that, when case 10 is in its FIG. 8 configuration, the outside surface of the portion of the lid's panel 21 which projects laterally beyond the bottom of the box will be of more or less square configuration.

USE OF THE EMBODIMENT

Each of FIGS. 7–10 inclusive illustrates a different orientation of case 10 providing a different mode of viewing the meter 60 when attached to the case and when being used. Considering first the viewing situations of FIGS. 7 and 8, for those situations the meter 60 is positioned within box 11 "forwardly" in the sense that the front end of the meter is at the front end of the box. The meter is secured to the bottom panel 12 of box 11 by removing the screw 75 (FIG. 5) from the meter, passing that screw in the forward direction upward through eyelet 27 in the panel so as to reinsert the screw in its receiving hole in the bottom of the meter, and then tightening the screw. Preferably the meter for purpose of its protection is secured in such manner to box 11 at all times when being transported in case 10.

The simplest mode of viewing the meter while in case 10 is depicted in FIG. 7 in which the case is placed on a horizontal support surface 80 such as is provided, for example, by a table, the bottom of the box 11 of the case rests flush on such surface, and the lid 20 is swung back from its closed position with the box to a position at which the front end of the lid merely lies on top of the support surface.

The FIG. 7 viewing mode requires that the observer be able to stand close to the case 10 so that he (or she) can look more or less directly down on meter 60. For situations where the case can conveniently be supported by a horizontal surface but the observer must be located a horizontal distance away from the case, the FIG. 8 viewing mode is convenient. To provide that mode, lid 20 is moved from its closed position with the box through about 270° to its inside-out position, and, the lid is releasably secured to the rear of the box by snapping together the parts 51 and 52 of the fastener 50. The case 10 is then placed on surface 80 so that the front end of box 11 and the front end of lid 20 rest on such surface, and so that the lid props up the rear end of the box to tilt it. The face of the meter 60 can than be easily seen by an observer even though he (or she) is horizontally removed a distance away from the case.

In the FIG. 9 viewing mode, the case 10 does not rest on any surface but is supported by the strap 40 passed around the neck of the observer and extending downward at an inclination to the vertical. For such viewing mode, the position of meter 60 within box 11 must be reversed. This is done by removing screw 75 from the meter, turning the meter 180° in the box, passing the screw upward through eyelet 28 in panel 12 and back into the meter, and then tightening the screw. Because the strap is inclined to the vertical, the weight of the case and meter generates a horizontal force component which presses the lid 20 against the waist of the observed so as to stabilize any tendency of the box 11 to pivot around the rings 41 through which it is supported by the strap. Accordingly, the box 11 and the meter 60 therein will remain stable in more or less horizontal position so as to permit convenient viewing of the meter. The FIG. 9 viewing mode is well adapted for situations where the observer must take meter readings while moving frequently from place to place.

To realize the viewing mode depicted by FIG. 10, the screw 75 is removed from the back of meter 60, the meter is removed from the box 11, the lid 20 is secured by fastener 50 to the back of the box, and the case 10 is then positioned on support surface 80 so that the lower end of snap fastener 31 and the rear ends of the side flanges 22 and 23 of the lid all rest on that surface to provide, in effect, a three support for the case. When the case is so positioned on support 80, the outside surface of the bottom 12 of box 11 is (as shown in FIG. 10) almost vertical but tilted slightly to the rear. To mount the meter on the case, the meter is held by hand to bear gently against that outside surface with the front end of the meter being down, the screw 75 is next pushed through eyelet 28 in the reverse direction (ie., from the inside to the outside of the bottom 12 of box 11) and into the back of the meter, and the screw 75 is than tightened to secure the meter to the outside of the bottom panel 12 of the box 11. The FIG. 10 mode of viewing the meter is convenient to instances where the meter and its case can be rested on a support surface but where the meter should be almost vertical in order to be properly observed.

The above described embodiment being exemplary only, it is to be understood that additions thereto, omissions therefrom and modifications thereof can be made without departing from the spirit of the invention. Thus, for example, the fastening means 50 need not be a snap button but may be some other kind of fastener such as a hook and loop fastener which is commercially well known, and, which as applied to case 10 would comprise two layers of fabric secured to the outer surfaces of, respectively, panel 21 and rear wall 14 to extend transversely across those outer surfaces at the locations thereon where parts 51 and 52 of fastener 50 are shown as being placed, such layers of fabric being adapted when brought into pressure contact to engage fibers so as to releasably secure the lid 20 to the back of box 11.

Further, the meter securing means provided by eyelets 27 and 28 may be replaced by an elastic band extending transversely across the inside of box 11 at a longitudinally central position therein, and under which band the meter 60 may be slipped to thereby be resiliently held by the hand inside the box either in forward position (i.e, with the front of the meter at the front of the box) or in reverse position (i.e., with the front of the meter towards the back of the box) so as to permit all of the described viewing modes of the meter except that of FIG. 10.

Still further the case 10 may include an adapter board adapted to be selectably inserted into or removed from the compartment of box 11 and, when so inserted, to accommodate within the box an electrical instrument of less than normal size.

Accordingly, the invention is not to be considered as limited save as is consonant with the recitals of the following claims.

What is claimed is:

1. A carrying case for an electrical instrument comprising, an open topped box having a bottom, a front wall, a rear wall and a pair of side walls, said side walls being about three times longer than the height of said rear wall, and the width of said front and rear walls being about twice greater than said height, a lid having a rectangular top panel having a length and width approximating that of, respectively, said side walls and said rear wall, and having, also, respectively, said side walls and said rear wall, and having, also, side flanges depending from the side edges of said panel, said lid being adapted to fit over and close the top of the box with said flanges being on the outside of, and overlapping with, the corresponding walls of said box, all said elements of said box and lid being relatively rigid and having a laminated structure comprising an inner layer of stiff material and an outer layer of flexible material, a flexible hinge joining the top edge of said rear wall of said box to the rear edge of said panel of said lid, said hinge being provided by a strip of said flexible material constituting a portion longitudinally central of, and transversely extending across a sheet of said flexible material providing on longitudinally opposite sides of said strip the flexible material of the laminated structure of, respectively, said rear wall and said panel, said hinge enabling said lid to be swung about 270 degrees thereabout from its box closing position to an inside out position at which the normal outside of said panel is adjacent and substantially parallel to the rear wall of said box, fastening means comprising mutually engageable parts carried by, respectively, said rear wall and said panel and adapted by engagement of said parts to releasably fasten said panel in said inside-out portion to the rear of said box so as to provide a prop raising said rear when said box and lid are placed on a horizontal support surface, and a pair of eyelets formed at a longitudinally central location in the bottom of said box along the longitudinally centerline thereof in longitudinally spaced relation from each other, said eyelets being adapted, in conjunction with a screw passed through either thereof into a hole formed in the bottom of such an instrument to be centrally located in the width thereof, to provide instrument securing means enabling such instrument to be secured to the bottom of said box either inside or outside such bottom, and forwardly or reversely in relation thereto, and, in all such cases, in centered relation with such bottom.

* * * * *